United States Patent
Katiyar et al.

(10) Patent No.: US 9,367,619 B2
(45) Date of Patent: Jun. 14, 2016

(54) LARGE SCALE REAL-TIME MULTISTAGED ANALYTIC SYSTEM USING DATA CONTRACTS

(75) Inventors: Atul Katiyar, Redmond, WA (US); Purushottam Amradkar, Sammamish, WA (US); Nitin Gupta, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 408 days.

(21) Appl. No.: 13/194,084

(22) Filed: Jul. 29, 2011

(65) Prior Publication Data

US 2013/0031143 A1    Jan. 31, 2013

(51) Int. Cl.
*G06F 17/30* (2006.01)

(52) U.S. Cl.
CPC .... *G06F 17/30864* (2013.01); *G06F 17/30846* (2013.01)

(58) Field of Classification Search
USPC ........................................................ 707/805
See application file for complete search history.

(56) References Cited

U.S. PATENT DOCUMENTS

| | | | |
|---|---|---|---|
| 7,222,121 B2 | 5/2007 | Casati et al. | |
| 7,461,077 B1* | 12/2008 | Greenwood | G06F 3/0482 715/765 |
| 2003/0058277 A1* | 3/2003 | Bowman-Amuah | G06F 17/30607 709/223 |
| 2006/0173985 A1* | 8/2006 | Moore | G06F 17/3089 709/223 |
| 2006/0259442 A1* | 11/2006 | Iqbal | G06Q 30/0283 705/400 |
| 2007/0050206 A1* | 3/2007 | Whikehart | G06Q 10/04 705/2 |
| 2007/0219976 A1* | 9/2007 | Muralidhar et al. | 707/4 |
| 2008/0134139 A1* | 6/2008 | Krouse | G06F 8/10 717/105 |
| 2008/0147698 A1* | 6/2008 | Gustafsson | G06F 17/30569 |
| 2009/0019065 A1 | 1/2009 | Sapounas | |
| 2010/0070448 A1* | 3/2010 | Omoigui | H01L 27/1463 706/47 |
| 2010/0070514 A1 | 3/2010 | Woodruff | |
| 2010/0198716 A1* | 8/2010 | Chatzky | G06Q 40/06 705/37 |
| 2011/0016379 A1* | 1/2011 | McColl | G06F 17/246 715/219 |
| 2011/0196891 A1* | 8/2011 | de Castro Alves et al. | 707/769 |
| 2012/0203782 A1* | 8/2012 | Olston et al. | 707/737 |
| 2012/0246170 A1* | 9/2012 | Iantorno | 707/748 |

OTHER PUBLICATIONS

Kurh, Tom, "Truviso's Web Analytics Application: Visitor Insight & Analytics", Retrieved at <<http://www.truviso.com/blog/tag/web-analytics/>>, May 4, 2010, p. 1.

(Continued)

*Primary Examiner* — Shyue Jiunn Hwa
(74) *Attorney, Agent, or Firm* — Judy Yee; Bryan Webster; Micky Minhas (57) ABSTRACT

An analytic system may have a number of processing stages. One or more data sources may provide data to a first processing stage. The first processing stage may specify one or more data contracts having a schema describing a layout and types of data provided by the one or more data sources. Each of the processing stages may specify a respective data contract having a schema such that the processing stages may understand a layout and types of data provided as input to the processing stages. The data contracts me further specify a valid range of values for various items of data described by schemas. Data not conforming to a data contract may be automatically filtered out such that a corresponding processing stage may not be provided with the non-conforming data.

9 Claims, 5 Drawing Sheets

(56) References Cited

OTHER PUBLICATIONS

Blakeley, et al., "Next-Generation Data Access: Making the Conceptual Level Real", Retrieved at <<http://msdn.microsoft.com/en-us/library/aa730866(v=vs.80).aspx>>, Jun. 2006, pp. 22.

"Longitudinal Analytics of Web Archive Data", Retrieved at <<http://cordis.europa.eu/fp7/ict/fire/docs/fp7-factsheets/lawa_en.pdf>>, Retrieved Date: May 9, 2011, pp. 2.

"Anametrix Bio", Retrieved at <<http://www.spiwebanalytics.com/vendor-bios/anametrix-bio.html#axzz1Lv3FFZ7N>>, Retrieved Date: May 10, 2011, pp. 2.

"Tealium Deployment Toolkit: New Implementation Toolkit Decouples Web Development from Web Analytics Implementation", Retrieved at <<http://www.tealium.com/resources/tealium_deployment_toolkit.pdf>>, Retrieved Date: May 9, 2011, pp. 2.

* cited by examiner

```
IPipelineJob[Step_1(string @input)] = new FileEnumerator
{
   Input = new FileSource { Name = "source", Path = @input, Files = @"*.txt" },
   Output = new LogFileProcessor
   {
      Schema = new SchemaDefinition          }502
      {
         Name = "Step_1_Schema",
         Columns = new[]
         {
            "Time:datetime",
            "Cluster:string",
            "ItemId:int",
            "CallerId",                          504
            "ApplicationId:int",
            "RequestLength:long",
            "ResponseLength:long",
            ...
         },
      },
      Pipeline = new LogRowPipeline
      {
         Steps = new IPipelineRowTransform []
         {
            ...
         },
         ...
      },
   },
}
```

LARGE SCALE REAL-TIME MULTISTAGED ANALYTIC SYSTEM USING DATA CONTRACTS

BACKGROUND

An analytic system such as, for example, a web analytic system, may have three basic components, a data collection component, a data processing component and a data visualization component. Instrumentation data may be generated from various data sources including, but not limited to, an end-user client application, an application/web server, as well as other data sources, which may provide varied instrumentation that each application records and measures. As a result, each of the components of an analytic system may receive heterogeneous data with varied schema and semantics. Heterogeneity is eventually propagated from the data collection component to lower layers of the analytic system, such as, for example, data processing and data visualization.

Some existing analytic systems process heterogeneous data from different data sources by transforming the heterogeneous data to produce transformed data conforming to a generic schema in early stages of the analytic systems. The analytic systems then operate on the transformed data. However, these analytic systems are inefficient due to processing overhead for transforming the heterogeneous data, and storage and processing overhead due to mapping an application-specific schema to a generic schema for much of a processing pipeline. In addition, the analytic systems may inefficiently use processing/storage capabilities if many attributes of the generic schema are unused. Further, because data processing in the analytic systems is tightly coupled with the generic schema, any changes or upgrades to the systems are propagated through various components or layers.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a multi-staged data analytics system has a number of processing stages. Each processing stage of the processing stages has respective data contracts with regarding data to be consumed by the each processing stage and data to be produced by the each processing stage for a next processing stage. The schemas may specify a layout of data and types of the data. Names of the data in a data contract may be changed to a simpler or more meaningful name for a processing stage. Because data processing is based on data contracts, various embodiments consistent with the subject matter of this disclosure may be adaptive and flexible with respect to any changes in provided data. For example, a change in provided data may result in one or more data contracts being reconfigured with no changes with respect to processing of the processing stages.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

DETAILED DESCRIPTION

Overview

A data contract specifies a layout of input data (or interstage data) consumed by a component of an analytic system. Embodiments consistent with the subject matter of this disclosure may use data contracts with respect to data that crosses a processing stage boundary of a data pipeline of an analytic system. As an example, assume an analytic system, such as a web analytic system, that has multiple processing stages in a data pipeline. In one embodiment, the multiple processing stages may include a data collection processing stage, a data aggregation processing stage, and a data visualization processing stage. A data contract with respect to data provided to the data collection processing stage from each of one or more data sources may specify a schema with respect to the data from each of the one or more data sources, such that the data collection processing stage understands a layout and a type of the data received from each of the one or more data sources. A data contract with respect to data provided to the data aggregation processing stage may specify a schema, such that the data aggregation processing stage understands a layout and a type of the provided data. A data contract with respect to a data visualization processing stage may specify a schema, such that the data visualization processing stage understands a layout and a type of the data provided to the data visualization processing stage.

When a change occurs with respect to data provided to a processing stage of the pipeline, only a data contract for the processing stage may change. Processing logic of the processing stage may remain unchanged. Thus, processing logic of each respective processing stage may be decoupled from any schemas specified by the data contracts, resulting in an analytic system with a highly flexible design.

Exemplary Operating Environment

Figure 1:
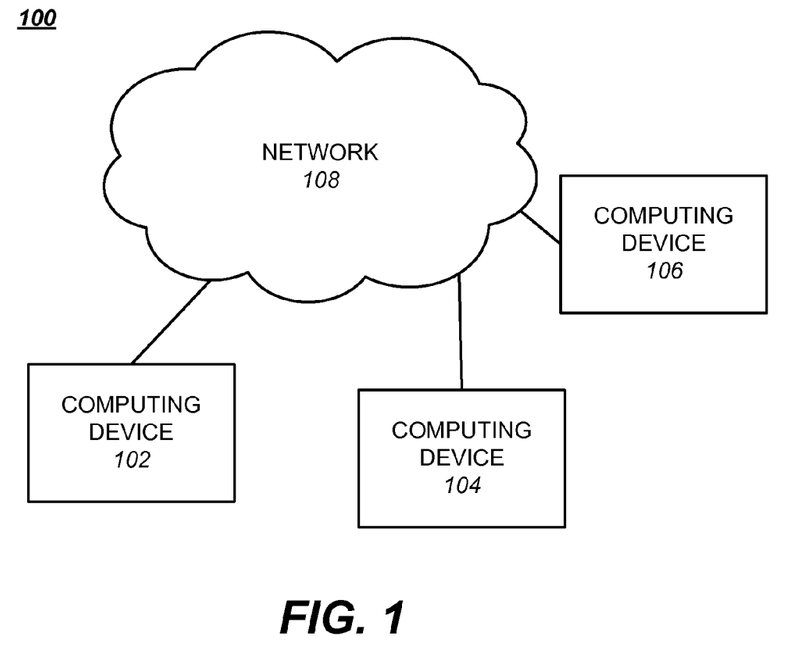
FIG. 1 illustrates an exemplary operating environment for various embodiments consistent with the subject matter of this disclosure.

FIG. 1 illustrates an exemplary operating environment 100 for various embodiments consistent with the subject matter of this disclosure. Operating environment 100 may include computing devices 102, 104, 106, which may be connected with one another via a network 108. One embodiment may be implemented in any one of computing devices 102, 104, 106 or various portions of an embodiment may be implemented in two or more of computing devices 102, 104, 106. The two or more of computing devices 102, 104, 106 may communicate with each other via network 108, which may be a single network or a combination of networks of various types including, but not limited to, a packet switching network, a frame relay network, a fiber optic network, the Internet, or other types of networks.

Although operating environment 100 shows three computing devices that may implement an embodiment, other embodiments may be implemented in only one computing device or two or more computing devices communicating with one another via one or more networks. In an embodiment implemented by only one computing device, the one computing device may or may not be connected to a network.

Exemplary Processing Devices

Figure 2:
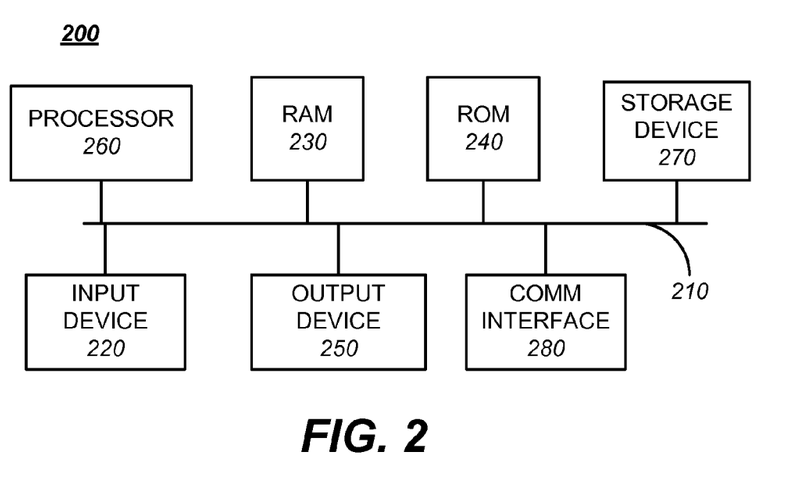
FIG. 2 is a functional block diagram of an exemplary computing device which may implement a portion of an analytic system or a complete analytic system.

FIG. 2 is a block diagram of an exemplary computing device 200, which may be used to implement a single or multiple computing device embodiment consistent with the subject matter of this disclosure. Computing device 200 may be a server, a personal computer (PC), or another type of computing device. Computing device 200 may include hardware, such as a processor 260, a bus 210, a memory, which may include a combination of random access memory (RAM) 230 and read only memory (ROM) 240, a storage device 270, an input device 220, an output device 250 and a communication interface 280.

Processor 260 may include one or more conventional processors that interpret and execute instructions. RAM 230, ROM 240, and/or another type of dynamic or static storage medium, respectively, may store information and instructions for execution by processor 260. RAM 230, or another type of dynamic storage medium, may store instructions as well as temporary variables or other intermediate information used during execution of instructions by processor 260. ROM 240, or another type of static storage medium, may store static information and instructions for processor 260. Some embodiments of computing device 200 may further include a hardware logic component, including, but not limited to, an application specific integrated circuit (ASIC) (not shown) and/or a field programmable gate array (FPGA) (not shown) that may be combined with instructions in memory 230, 240 to cause computing device 200 to perform a method.

Input device 220 may include a keyboard, a pointing device, or other device for providing input. Output device 250 may include a display, a printer, or other device for outputting information. Communication interface 280 may include a transceiver for sending and receiving information via network 108

Storage device 270 may include a machine-readable storage medium such as, for example, a magnetic disk, a writable optical disc, a flash RAM device, or other type of machine-readable storage media for storing data, instructions, or other information for more than a transitory time period. Non-limiting examples of storage device 270 may also include Digital Video Disk (DVD), compact Disk (CD), or other types of storage devices using other types of machine-readable storage media for storing data and/or instructions for later use.

Computing device 200 may communicate with other devices via a communication medium, which may include, but not be limited to a propagated signal on a carrier wave and may perform functions in response to processor 260 executing sequences of instructions contained in a machine-readable storage medium. Such instructions may be read into a machine-readable storage medium, including, but not limited to, RAM 230 from another machine-readable storage medium or from a separate device via communication interface (280).

Embodiments

Figure 3:
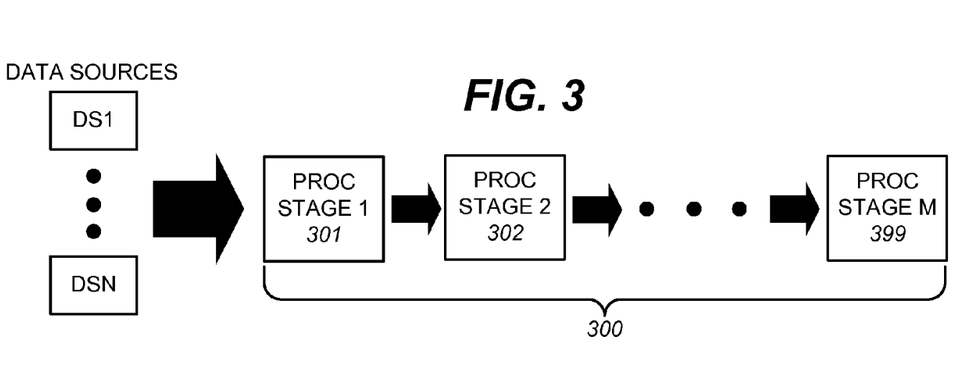
FIG. 3 is a block diagram showing an exemplary data pipeline with a number of processing stages and a number of data sources providing data to the data pipeline.

FIG. 3 illustrates an exemplary data pipeline 300 in an embodiment of an analytic system. Data pipeline 300 may include multiple processing stages 301, 302, . . . 399. Processing stage 301 may receive data from one or more data sources. Processing stage 301 may include respective data contracts specifying a respective schema for data provided from respective data sources. Processing stage 302 may input data processed or provided by processing stage 301 and may include a data contract specifying a schema for the data processed or provided by processing stage 302 . . . . Similarly, processing stage 399 may input data processed or provided by processing stage 398 (not shown) and may include a data contract specifying a schema for the data processed by processing stage 398.

Although FIG. 3 illustrates 99 process stages, an exemplary analytic system may have fewer processing stages, such as, for example, two processing stages, three processing stages, or another number of processing stages.

Figure 4:
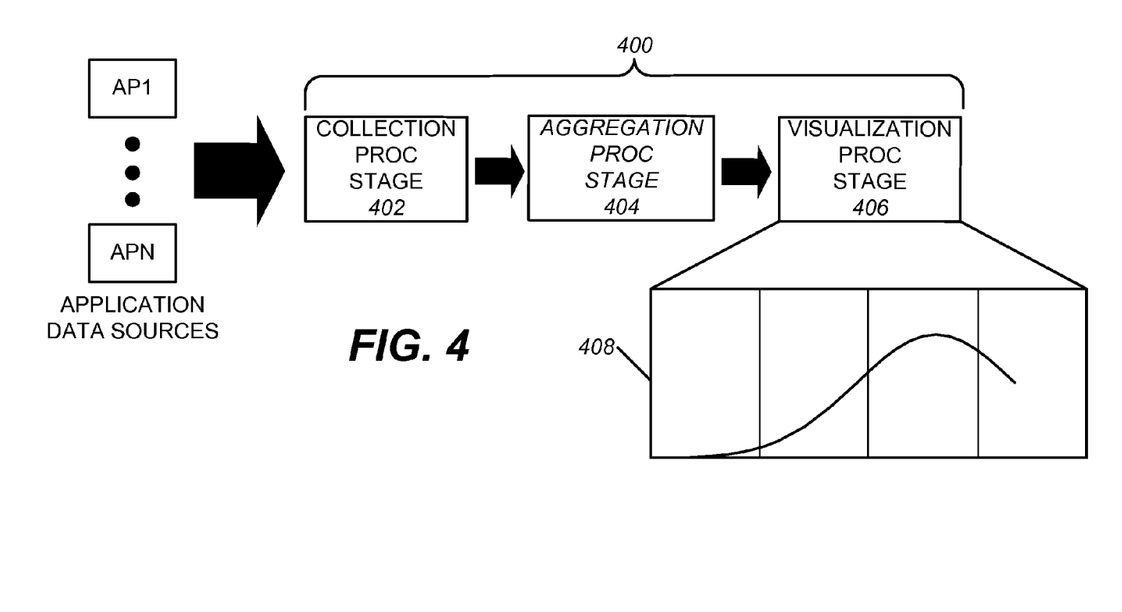
FIG. 4 is a block diagram of an exemplary data pipeline in one embodiment consistent with the subject matter of this disclosure.

FIG. 4 illustrates a data pipeline 400 for an exemplary web analytic system. Data pipeline 400 may include a collection processing stage 402, an aggregation processing stage 404 and a visualization processing stage 406. Collection processing stage 402 may be provided with data from one or more data sources. The one or more data sources may include, but not be limited to, one or more files, output from one or more applications, data from one or more databases, as well as other data sources. Collection processing stage 402 may include respective data contracts specifying a schema with respect to data from each of the one or more data sources. Aggregation processing stage 404 may be provided with input data processed by collection processing stage 402 and may include a data contract specifying a schema of the data provided by collection processing stage 402. Visualization processing stage 406 may be provided with input data processed by aggregation processing stage 404. In one embodiment, visualization processing stage 406 may process data in a database. Visualization processing stage 406 may include a data contract specifying a schema for the provided input data. Visualization processing stage 406 may render the provided data to produce a chart or a graph 408.

Figure 5:
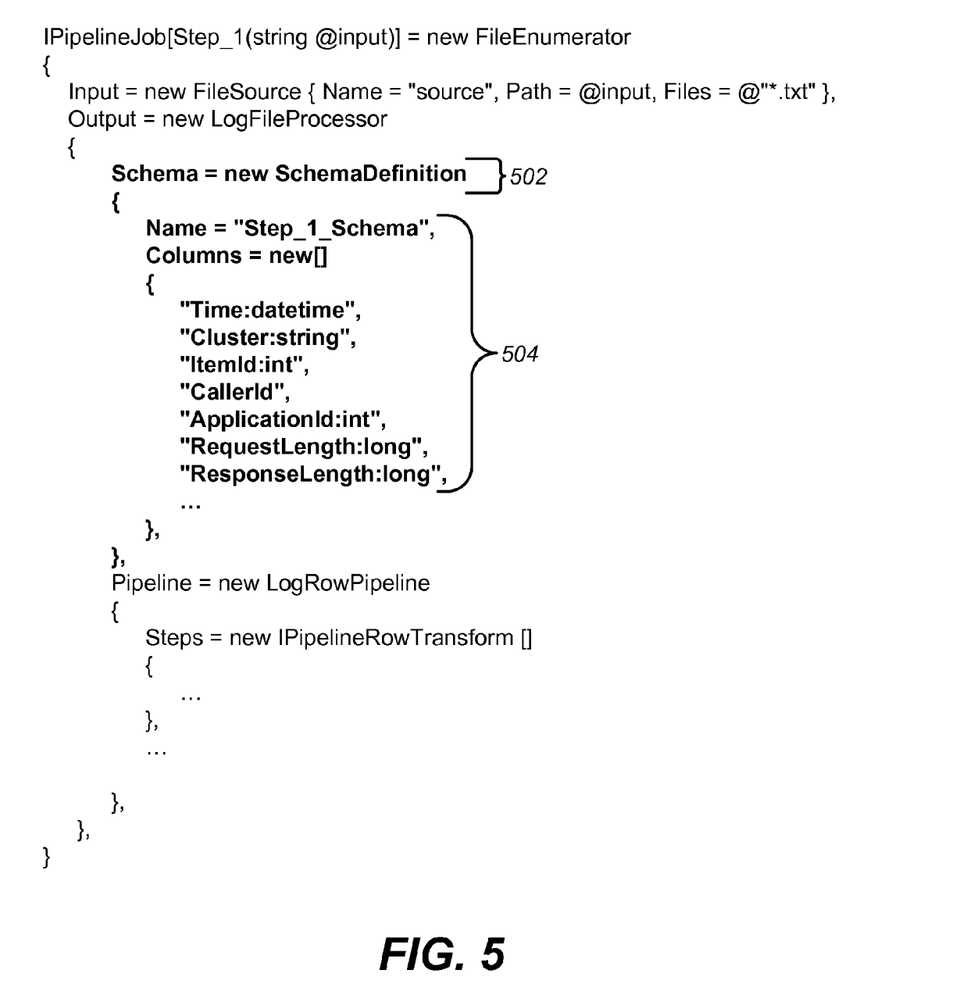
FIG. 5 is a SQL example showing an exemplary schema of a data contract.

FIG. 5 is exemplary SQL code having a data contract that specifies a schema for provided input data such that an aggregation processing stage may process the provided input data. The specified schema of the data contract is shown in bold. Line 502 indicates that the following lines specify a definition of a new schema. Line 504 specifies a name of the new schema as 'Step_1_Schema' containing seven items. The seven items, in this example, include: 'Time', which is in a particular format (date time) for specifying a date and a time; 'Cluster', which is a character string; 'ItemId', which is an integer; 'CallerId', which is in a default format (in this example, the default format is character string); 'ApplicationID', which is an integer; 'RequestLength', which is a long integer (in this example, a 64-bit integer); and 'ResponseLength', which is a long integer. Unbolded lines following the schema definition may include SQL statements for processing the provided data specified by the schema.

Figure 6:
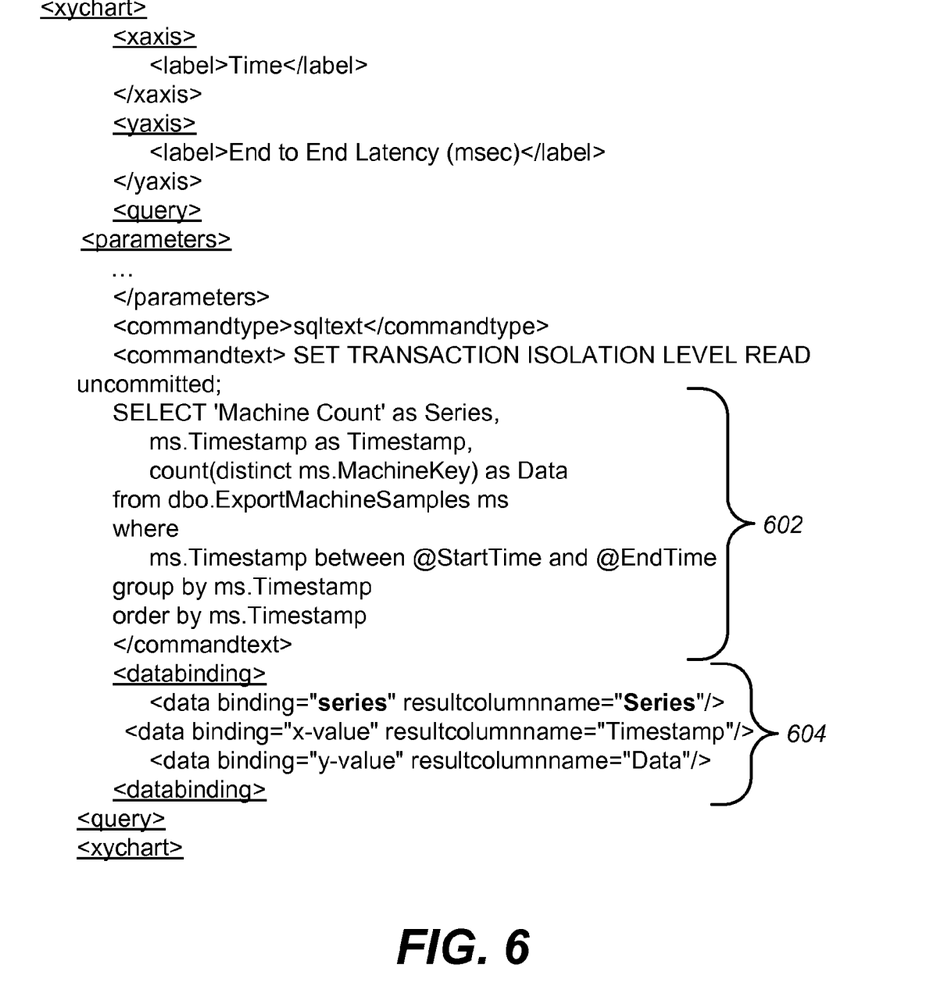
FIG. 6 is a SQL example showing a portion of a visualization processing stage in one embodiment.

FIG. 6 is exemplary SQL code for a data visualization processing stage having a data contract (not shown) that specifies a schema for provided input data such that the data visualization processing stage may process the provided data. In this example, the data produced by an aggregation processing stage had previously been stored in a database. The data contract (not shown) included in the data visualization processing stage may specify the schema with respect to the data stored in the database that is to be processed by the data visualization processing stage. The schema may specify a table called dbo.ExportMachineSamples with columns called 'Machine Count', 'Timestamp', and 'MachineKey'. A 'Select' command 602 indicates that the table 'dbo.ExportMachineSamples' is to be referred to as 'ms', the column 'Machine Count' is to be called 'Series', the column 'Timestamp' in the table now called 'ms' is to be called 'Timestamp', and a number of distinct values of the column 'MachineKey' are to be counted and stored in a variable referred to as 'Data'. A 'where' clause of 'Select' command 602 specifies that the values for the column 'Timestamp' in the 'ms' table are in a range from @StartTime to @EndTime. Rows produced by 'Select' command 602 are to be ordered by values of the 'Timestamp' column in the 'ms' table, which are to be grouped by the values of the 'Timestamp' column.

A data binding section 604 binds a result column named 'Series' to 'series', a result column named, 'Timestamp' to 'x-value', and a result column called 'Data' to 'y-value'. In this example, an xychart procedure of the data visualization processing stage receives the bound values for 'series', 'x-value' and 'y-value' and renders a graph or chart to an output device, such as, for example, a display device or other output device. In various embodiments, the visualization processing stage includes a number of user interface building blocks, such as, the xychart procedure, as well as other procedures for Venn diagrams, pie charts, histograms, and the like, which render the bound data.

Although the examples in FIGS. 5 and 6 are in SQL, other computer languages, such as, for example, other relational database languages, may be used in other embodiments.

Figure 7:
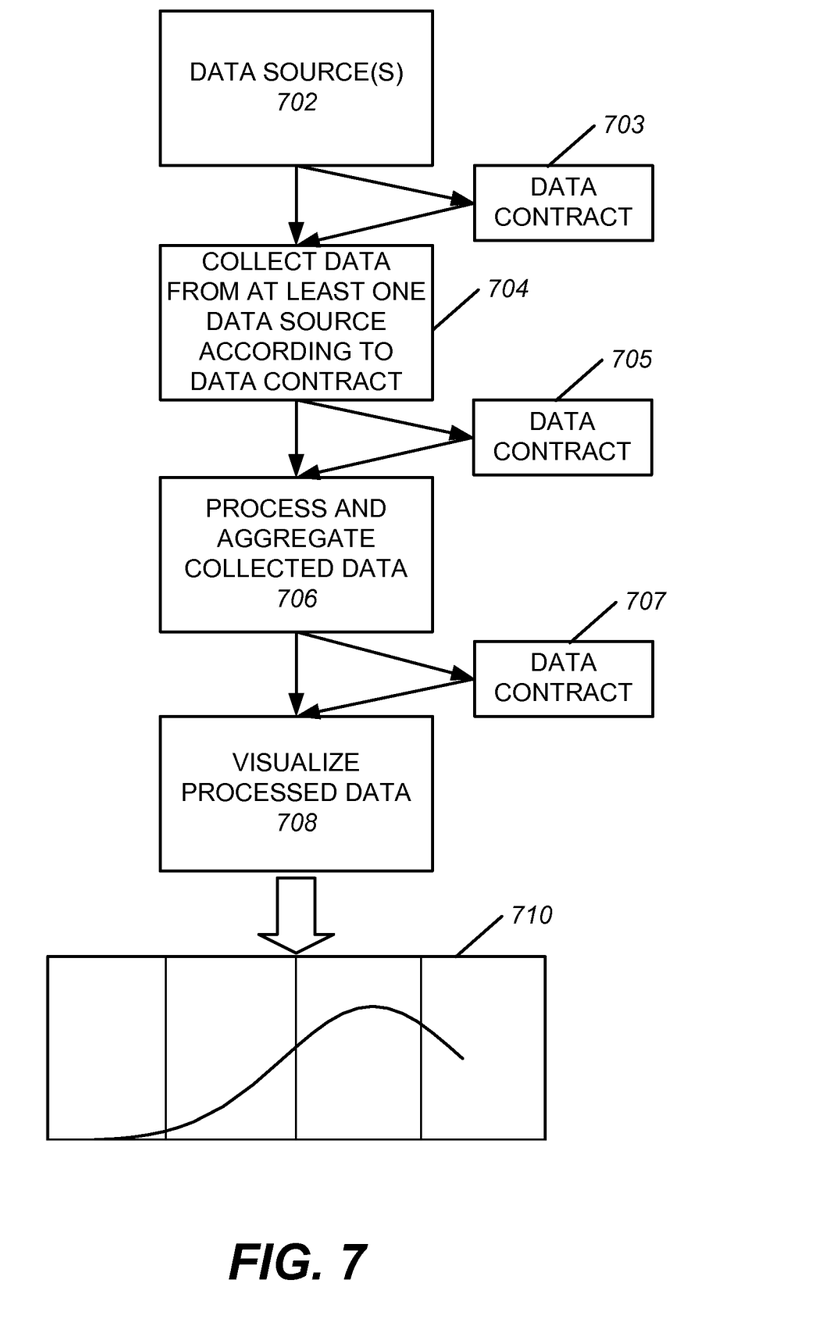
FIG. 7 is an exemplary flow diagram for a data flow in one exemplary embodiment of an analytic system.

FIG. 7 illustrates a flow of data through an exemplary real-time multi-staged analytic data processing system. One or more data sources 702 may provide data for a collection processing stage 704. A data contract 703 between the one or more data sources may specify a schema defining a layout of the data provided to the collection processing stage 704. Collection processing stage 704 may collect the data provided by the one or more data sources and may provide the collected data for an aggregation processing stage 706 according to a data contract 707 between aggregation processing stage 706 and a data visualization processing stage 708, which may then render a graph or chart 710 via an output device.

CONCLUSION

Embodiments consistent with the subject matter of this disclosure effectively decouple application instrumentation from a processing stage that consumes data generated through instrumentation. As a result, various processing stages are completely independent from instrumentation methodology. Design of multistage analytic data processing systems, according to embodiments consistent with the subject matter of disclosure, is completely agnostic with respect to a schema and semantics of data to be processed by the multistage analytic data processing system. By defining data processing based on data contracts, embodiments of the multistage analytic data processing systems are kept very generic and adaptive for various applications. Further, because applications specify a data contract in the various embodiments, "garbage" data may be filtered-out from "non-garbage" data, hence safe-guarding themselves from corrupted data. In addition, a specified data contract may enable filtering out of data of no interest from data of interest.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Accordingly, the appended claims and their legal equivalents define embodiments, rather than any specific examples given.

We claim as our invention:

1. A system comprising:
    a receiver configured to receive heterogeneous input data that is provided by at least one of a plurality of data sources;
    a memory configured to store at least one data contract that specifies a layout of the heterogeneous input data;
    a processor configured to:
        process, according to the layout specified in each of the at least one data contract, the heterogeneous input data without transforming the heterogeneous input data to conform to a generic schema;
        filter, according to the at least one data contract, the heterogeneous input data that does not conform to the at least one data contract;
        implement a collection processing stage configured to collect data provided by the at least one of a plurality of data sources;
        implement an aggregation processing stage configured to process and aggregate data provided by the collection processing stage; and
        implement a visualization processing stage configured to render data provided from the aggregation processing stage to an output device.

2. The system of claim 1, where the specified layout of each of the at least one data contract comprises a schema that describes the heterogeneous input data that is provided by the corresponding one of the plurality of data sources.

3. The system of claim 1 configured to provide, via the visualization processing stage, user interface building blocks.

4. A machine-readable storage medium storing instructions for more than a transitory time period that, based on execution by at least one processor of at least one computing device that includes memory, configure the at least one computing device to:
    execute, by the at least one computing device, at least one of a plurality of processing stages, where each processing stage of the plurality of processing stages includes at least one data contract that specifies a layout of heterogeneous input data received by the each processing stage that is provided by at least one of a plurality of data sources that includes the plurality of processing stages, where a first of the processing stages is a collection processing stage configured to collect data provided by the at least one of a plurality of data sources, where a second of the processing stages is an aggregation processing stage configured to process and aggregate data provided from the collection processing stage, and where a third of the processing stages is a visualization processing stage configured to render data provided from the aggregation processing stage to an output device;
    process, via the each processing stage according to the layout specified in each of the corresponding at least one data contract, the heterogeneous input data received by the each processing stage without transforming the received heterogeneous input data to conform to a generic schema; and filter, via the each processing stage according to the corresponding at least one data contract, the heterogeneous input data received by the each processing stage that does not conform to the corresponding at least one data contract.

5. The machine-readable storage medium of claim 4, where the specified layout of each of the at least one data contract comprises a schema that describes the heterogeneous input data that is provided by the corresponding one of the plurality of data sources.

6. The machine-readable medium of claim 4, where the instructions further configure the at least one computing device to provide, via the visualization processing stage, user interface building blocks.

7. A method performed on at least one computing device that includes at least one processor and memory, the method comprising:

executing, by the at least one computing device, at least one of a plurality of processing stages, where each processing stage of the plurality of processing stages includes at least one data contract that specifies a layout of heterogeneous input data received by the each processing stage that is provided by at least one of a plurality of data sources that includes the plurality of processing stages, where a first of the processing stages is a collection processing stage configured to collect data provided by the at least one of a plurality of data sources, where a second of the processing stages is an aggregation processing stage configured to process and aggregate data provided by the collection processing stage, and where a third of the processing stages is a visualization processing stage configured to render data provided from the aggregation processing stage, the method further comprising using, by the visualization processing to an output device;

processing, via the each processing stage according to the layout specified in each of the corresponding at least one data contract, the heterogeneous input data received by the each processing stage without transforming the received heterogeneous input data to conform to a generic schema; and filtering, via the each processing stage according to the corresponding at least one data contract, the heterogeneous input data received by the each processing stage that does not conform to the corresponding at least one data contract.

8. The method of claim 7, where the specified layout of each of the at least one data contract comprises a schema that describes the heterogeneous input data that is provided by the corresponding one of the plurality of data sources.

9. The method of claim 7 further comprising providing, via the visualization processing stage, user interface building blocks.

* * * * *